United States Patent [19]

Teschner

[11] Patent Number: 5,539,997
[45] Date of Patent: Jul. 30, 1996

[54] DEVICE FOR PROCESSING CORRUGATED BOARD

[75] Inventor: Klaus Teschner, Hamburg, Germany

[73] Assignee: Peters Maschinenfabrik, Hamburg, Germany

[21] Appl. No.: 325,499

[22] Filed: Oct. 19, 1994

[30] Foreign Application Priority Data

Oct. 19, 1993 [CH] Switzerland .......................... 03152/93

[51] Int. Cl.$^6$ .................................. F26B 25/00; F26B 9/00
[52] U.S. Cl. .................................................. 34/242; 34/611
[58] Field of Search ............................ 34/242, 146, 620, 34/624, 634, 611

[56] References Cited

U.S. PATENT DOCUMENTS

| | | | |
|---|---|---|---|
| 3,040,702 | 6/1962 | Eng et al. ........................ | 34/242 |
| 3,849,907 | 11/1974 | Lynch ............................... | 34/242 |
| 4,192,516 | 3/1980 | McCort ............................ | 34/242 X |
| 4,932,139 | 6/1990 | Lehtinen .......................... | 34/624 X |
| 4,947,559 | 8/1990 | Basler et al. . | |
| 5,259,124 | 11/1993 | Poterala .......................... | 34/242 X |

FOREIGN PATENT DOCUMENTS

| | | |
|---|---|---|
| 1592115 | 6/1970 | France . |
| 1260944 | 1/1972 | United Kingdom . |

*Primary Examiner*—Hoang Nguyen
*Attorney, Agent, or Firm*—Hill, Steadman & Simpson

[57] ABSTRACT

A device for processing corrugated board includes several lower heating plates on a surface of which the corrugated board web travels, a continuous belt having a lower run moving with the board for applying pressure to the corrugated board and a plurality of elements for loading the lower run of the pressure belt. The elements for loading the lower run of the pressure belt permit the removal of humidity residing in the corrugated board web and these different elements are realized so as to allow the adjustment of their pressure force on the upper face of the lower run of the pressure belt. The elements include one or more brushes mounted to act on the upper surface of the lower run of the continuous belt.

9 Claims, 4 Drawing Sheets

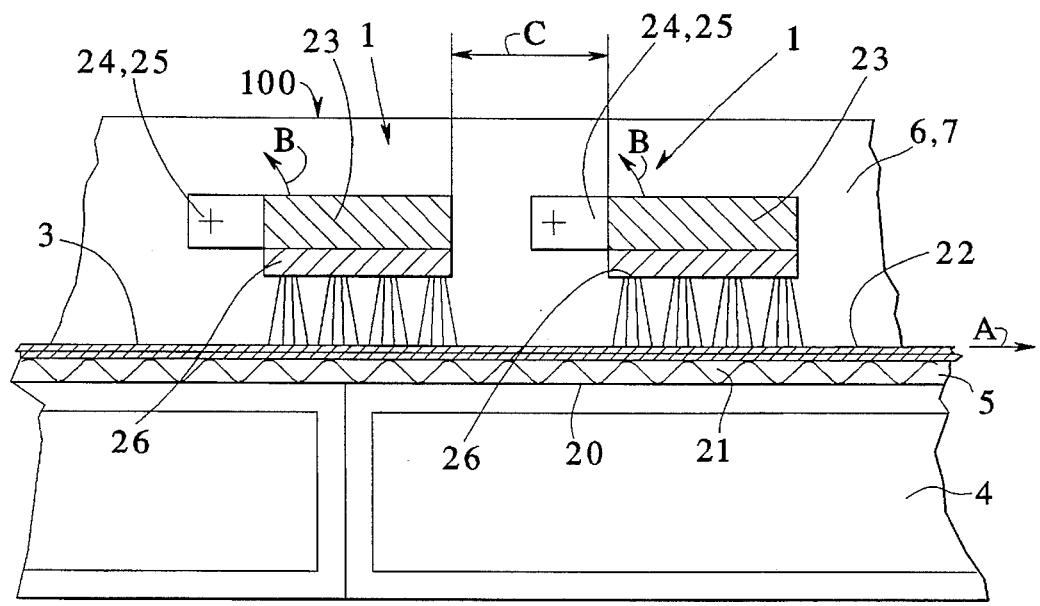
*FIG. 1*
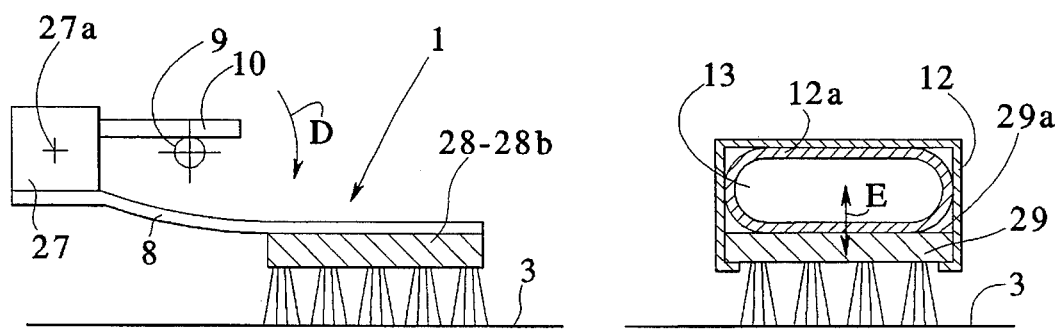
*FIG. 2*  *FIG. 3*

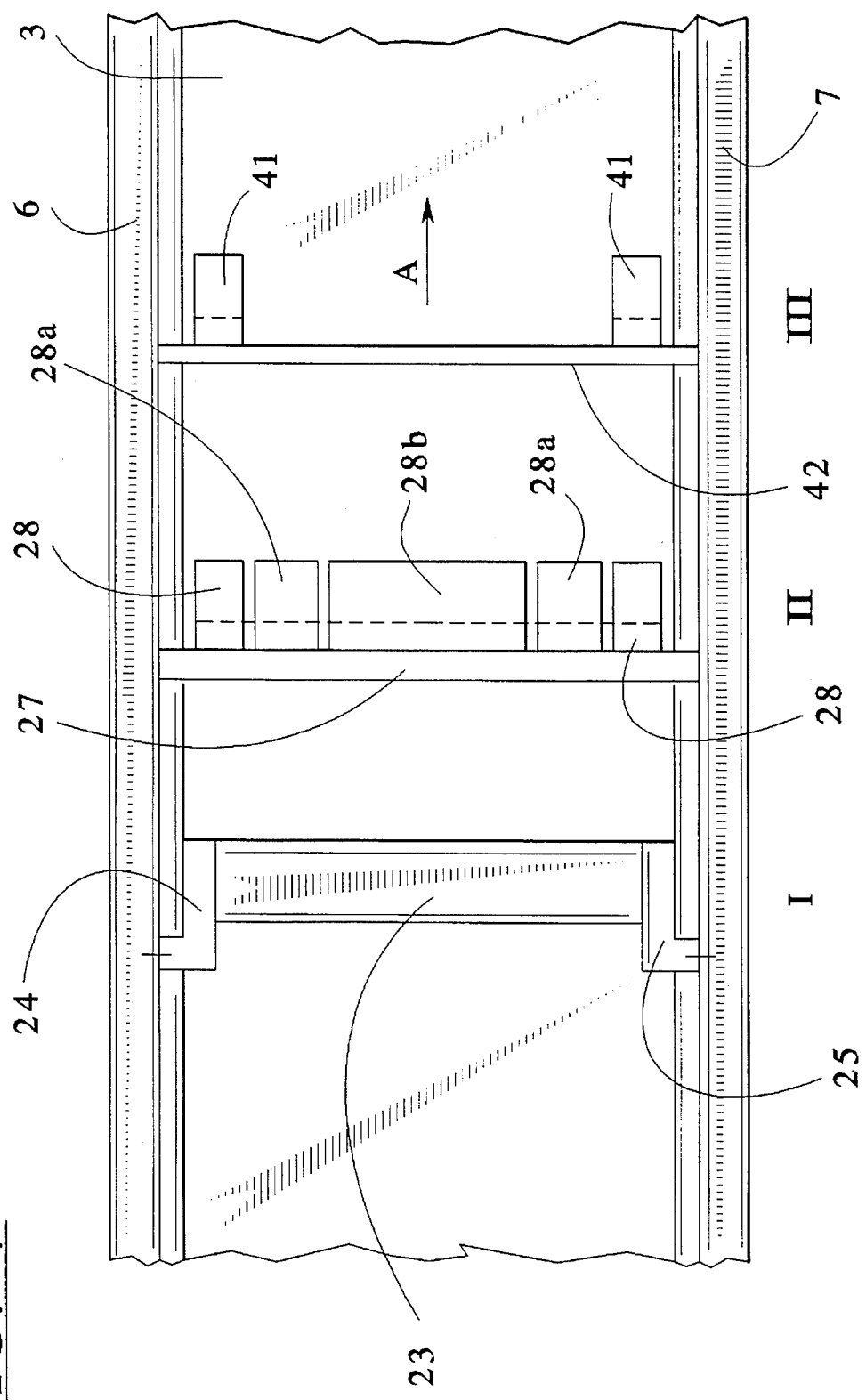

DEVICE FOR PROCESSING CORRUGATED BOARD

BACKGROUND OF THE INVENTION

The present invention is directed to a device for processing a corrugated board web having a core web of preglued corrugations with upper and lower cover paper webs secured to the corrugations of the core web. The device includes at least one lower heating plate, a pressure belt disposed above the plate to form a path for receiving the corrugated board web moving in a first direction at a first linear speed with the belt moving with the same linear speed as the corrugated board web and pressing the upper paper web against the core web, and means acting on the pressure belt to load the belt.

In common practice, such devices are used in the heating section of a so-called double-facing station of a corrugated board manufacturing machine. In this station of the machine, the corrugated board, which is made up by the glue assembly consisting of lower and upper smooth cover paper webs as well as of a corrugated web is subjected to a heating process which is to ensure the definite gluing and the drying of the various webs. This heating process usually occurs with the corrugated board web travelling onto a series of heating plates, which are made out of cast iron or steel and are heated with steam which circulates within the heating plates.

An endless pressure belt, whose lower run is pressed onto the upper cover paper web of the corrugated board web, keeps the corrugated board web in contact with the heating plates. The pressure rate of the pressure belt is amplified by free rotating rollers which are arranged in grooves or on pivoting levers in such a way that they may rest on the pressure belt that is to ensure therewith a distribution, at least approximately, of their weight on the corrugated board web. To perfect the contact pressure of the corrugated board on the heating plates, each roller supporting element is associated with a jack provided with fluid under pressure, which system allows the modification of the speed of the thermic transmission between the heating plates and the corrugated board web, when the pressure contact is changed. Such a device is described in French Document No. 1,592,115.

The main drawback with such a device remains in the fact that it is difficult, if not risky, to adjust the pressure exerted by the rollers on the belt with the thermic transmission speed selected so as to obtain an appropriate drying process which shall not deform to an unacceptable extent the corrugated board web by more or less flattening the corrugations of the web.

In order to avoid this phenomenon, it has been provided to replace the rollers with a series of pressure boxes provided with compressed air. The pressure exerted by the compressed air of the boxes presses the pressure belt onto the corrugated board web with a uniform rate, thus allowing the setting of the pressure by making the air pressure vary in the different boxes. U.S. Pat. No. 4,947,559, whose disclosure is incorporated herein by reference thereto, discloses such a device.

In this field, the professionals are always aware of another device that also makes use of pressure boxes in which a movable plate has been arranged which closed almost the whole lower part of the box in such a way that the pressure is transmitted mechanically onto the pressure belt in order to keep a better distribution of the pressure on the belt.

As already mentioned, the use of rollers and jacks that apply the pressure stress transmitted onto the pressure belt causes deformation of the corrugated board web. However, this solution permits the removal of humidity resulting from the steaming of the water residing in the glue which will have served for the assembly of the various paper webs making up the corrugated board web. This removal is an absolute necessity for obtaining corrugated board webs of an acceptable quality.

The other two above-described devices have non-neglectable advantages with regard to the impossible deformation of the corrugated board, but interfere at a large rate with the removal of the humidity, which fact is unacceptable for the manufacture of high-quality corrugated board.

SUMMARY OF THE INVENTION

The object of the present invention is to overcome the above-mentioned drawbacks by putting forth a loading device in which the corrugated board would not be deformed when being loaded and which would permit the optimal removal of the web humidity during the drying process.

To accomplish these goals, the present invention is directed to a device for processing corrugated board having a core web of preglued corrugations with upper and lower cover webs secured to the corrugations of the core web, said device having at least one lower heating plate and a pressure belt disposed above the heating plate to form a path for receiving the corrugated board moving in a first direction at a linear speed, said belt travelling at the same linear speed as the corrugated board web and pressing the upper cover paper web against the core web, and means acting on the pressure belt to load the belt. The improvements are that the means to load the pressure belt consist of elements that permit the removal of humidity residing in the corrugated board web and by the fact that these different elements are realized so as to allow the adjustment of their pressure force on the upper surface of the lower run of the moving pressure belt. These means for loading include brushes which act on the upper surface of the lower run of the belt.

Other advantages and features of the invention will be readily apparent from the following description of the preferred embodiments, the drawings and claims.

BRIEF DESCRIPTION OF THE DRAWINGS

FIG. 1 is a schematic cross sectional view of part of a device for applying pressure to the belt which is pressing a corrugated board onto the heating plates;

FIG. 2 is a schematic cross sectional view of a first embodiment of applying pressure to the belt;

FIG. 3 is a cross sectional view of a second embodiment for applying pressure to the belt;

FIG. 7 is a top plan view illustrating the location of the pressure elements in the heating section of the device.

DESCRIPTION OF THE PREFERRED EMBODIMENTS

Figure 4:
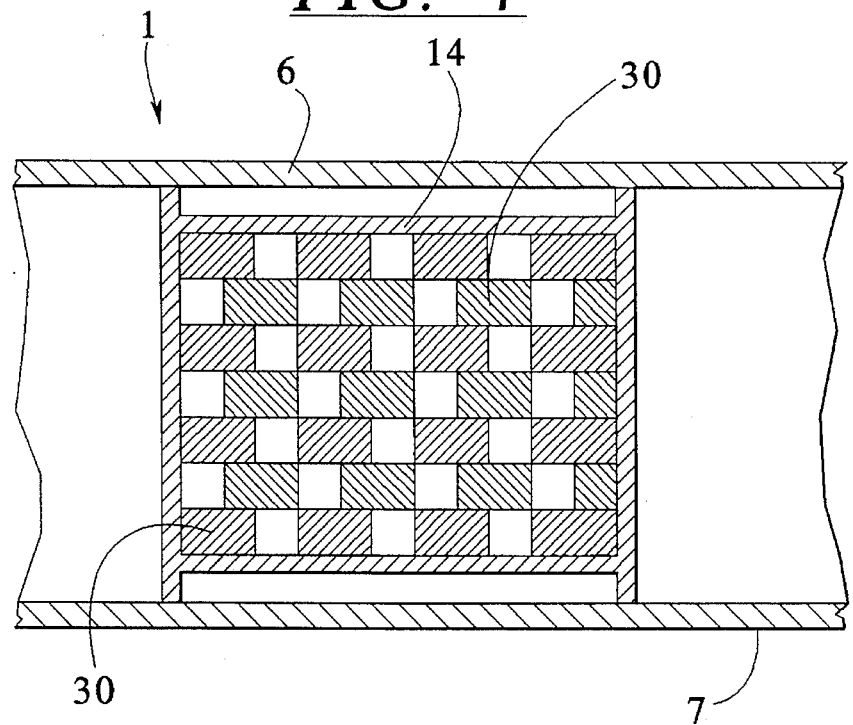
FIG. 4 is a cross sectional view of a third embodiment taken on line IV—IV of FIG. 5 showing an arrangement of brushes for applying pressure to the belt.

The principles of the present invention are particularly useful when incorporated in a device, generally indicated at 100 in FIG. 1, for processing a corrugated board web 5 moving in a direction of arrow A.

The device 100 includes a heating section of a corrugated board manufacturing machine and has a plurality of pressure elements 1 arranged in this section. The heating section usually includes a series of heating plates 4 having the shape of tubular or hollow elements which extend between lateral frames 6 and 7 (see FIGS. 5 and 6). These plates are brought to the desired temperature by means of steam which circulates within each of them. The corrugated board web 5 (FIG. 1) consists of a lower sheet 20 onto which the corrugated web 21 is glued with the lower tips or flutes of its corrugations and of an upper cover paper web 22 which is also glued to the upper tips or flutes of the corrugations of the corrugated web 21.

With a view of drying the corrugated web 5, it travels in the direction of the arrow A onto the upper surfaces of the heating plates 4 and to enhance the heat transfer distributed by the heating plates 4, this web is pressed more or less into the upper side of the heating plates 4 by means of a lower run of a continuous pressure belt 3, which belt in the lower run is moving at the same linear speed and direction as the web 5 whose lower run acts on the upper cover sheet 22. To distribute pressure on the lower run of the belt 3, the pressing elements 1 are provided.

In the embodiment illustrated in FIG. 1, the pressure elements 1 consist of elements which permit the removal of humidity resulting from the drying of the corrugated board web 5. These elements include, among others, crossbars 23 which are mounted to extend across the whole width of the heating section of the frame and are equipped on both ends with levers, such as 24 and 25, respectively (best illustrated in FIG. 7), which allow a pivotable mounting of the bar 23 in the lateral frame members 6 and 7. Every bar is provided on its lower part with a brush 26 (FIG. 1) having the same length as the crossbar 23. The brushes, whose hardness will be chosen according to the pressure stress which is to be applied onto the lower run of the pressure belt 3, will transmit mechanically to the pressure belt 3 the pressure forces resulting from the weight of the assembly of the bar and brush. In order to take into consideration the various pressure conditions which are wished to be applied from case to case to the pressure belt 3, it is convenient to have the possibility of rendering inoperative any one of the assemblies of bar and brush. To this aim, a sufficient space C is left between every assembly of bar and brush so as to leave room for the assembly of the bar and brush to be pivoted upward in the direction shown by arrow B in order for it to be finally put in a vertical position representing its inoperative position.

It could also be envisioned to use a series of pressure elements 1 which would be independent from one another and arranged on the lever tilting around a crosswise shaft that extends from one lateral frame 6 to the other frame 7.

In FIG. 2, an embodiment of the pressure element 1 is illustrated. In this execution, a crosswise beam 27 extends between the lateral frames 6 and 7 in order to carry brushes, such as 28–28b, having different lengths. The crosswise beam 27 is arranged between the two lateral frames so that it will be able to pivot or tilt around its axis 27a. The crosswise beam 27 is also provided at its ends with a locking means (not represented) so as to allow it to be locked into an angular position in order to transmit to the pressure belt 3 the force coming from the spring 8. Each brush 28 is mounted on one end of the spring blade or elastic blade 8, whose other end is permanently fixed to the crosswise beam 7 by means of screws. With the aim of adjusting the pressure exerted on the pressure belt by the elastic blade 8 and by the weight of the brush 28–28b, according to the thickness of the corrugated board web 5, it is foreseen to fit at every end at the crosswise beam a stop pin 10 which will rest against a stop 9 in order to limit the amount of rotation of the brushes 28–28b in the direction shown by the arrow D.

For obtaining a larger range of settings, it could, for instance, be realized that the stop 9 be provided with the shape of an eccentric trunnion to allow adjusting its position.

Obviously, the stop pin 10 and the stop 9 have to be arranged close to the lateral frames 6 and 7 in such a way that they will not hinder the upward tilting of the brushes so that the latter may be put into an inoperative position, as has already been mentioned with regard to the device illustrated in FIG. 1.

A second embodiment is shown in FIG. 3. In this embodiment, a brush 29 is fitted so as to move vertically in the direction shown by the double-arrow E within a tubular beam 12 which is opened along one side to form a channel-shaped member or beam. An expandable chamber 13 that acts under the influence of a fluid, such as compressed air, for instance, is disposed between the upper surface 29a of the brush 29 and a surface 12a of the beam 12. With this execution, the setting of the pressure of the brush 29 on the pressure belt 3 is achieved by varying the fluid pressure in the expandable chamber 13, which action will force the brush to press more or less onto the pressure belt with different degrees of pressure. In this example, the tubular beam will no longer be connected to the crosswise beam 27 through the elastic blade, but through one or several rigid small bars (not represented). The stroke of the crosswise beam 27 is limited owing to similar elements as those described with regard to FIG. 2. It is to be noted that this solution also allows the use of brushes having different lengths. Each of the different brushes has to be positioned along the channel-shaped beam 12 by means of, say, small stop pieces (not represented) provided inside the tubular beam 12.

Figure 5:
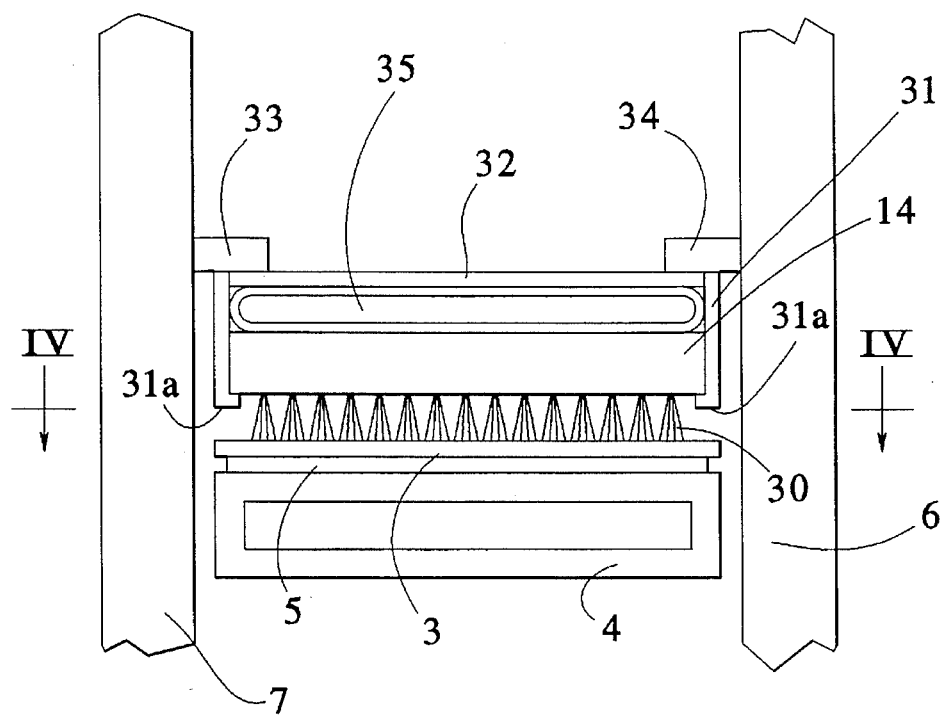
FIG. 5 is an end view of the arrangement of FIG. 4.

A third embodiment is illustrated in FIG. 4, wherein the pressure element is formed by a plurality of brushes 30 which are mounted in a frame 14, which is mounted between the lateral frame members 6 and 7. In this execution, the brushes are arranged in a checkerboard pattern so as to have spaces remaining between each of them. For this distribution, the frame 14 can be connected to the lateral beams or members 6 and 7 by means which allow the adjustment of the pressure of the brushes 30 onto the pressure belt 3. A way of accomplishing this is the means illustrated in FIGS. 5 and 6. In the arrangement of FIG. 5, the frame 14 which carries the brushes is mounted so as to slide vertically in a cradle 31 that is closed at its upper part by a sheet 32 and is provided at its lower part with stop fingers 31a in order to limit the vertical downward stroke of the frame 14 which carries the brushes 30. The frame 14 also has grooves (not represented) for positioning the brushes 30, one with regard to the other. Moreover, the cradle 31 is mounted on the lateral frame members 6 and 7 by means of fastening clips, such as 33 and 34. The pressure is transmitted to the brushes by means of a pressure chamber 35, which is arranged between the upper part of the frame 14 and the closing iron plate 32 of the cradle 31.

Figure 6:
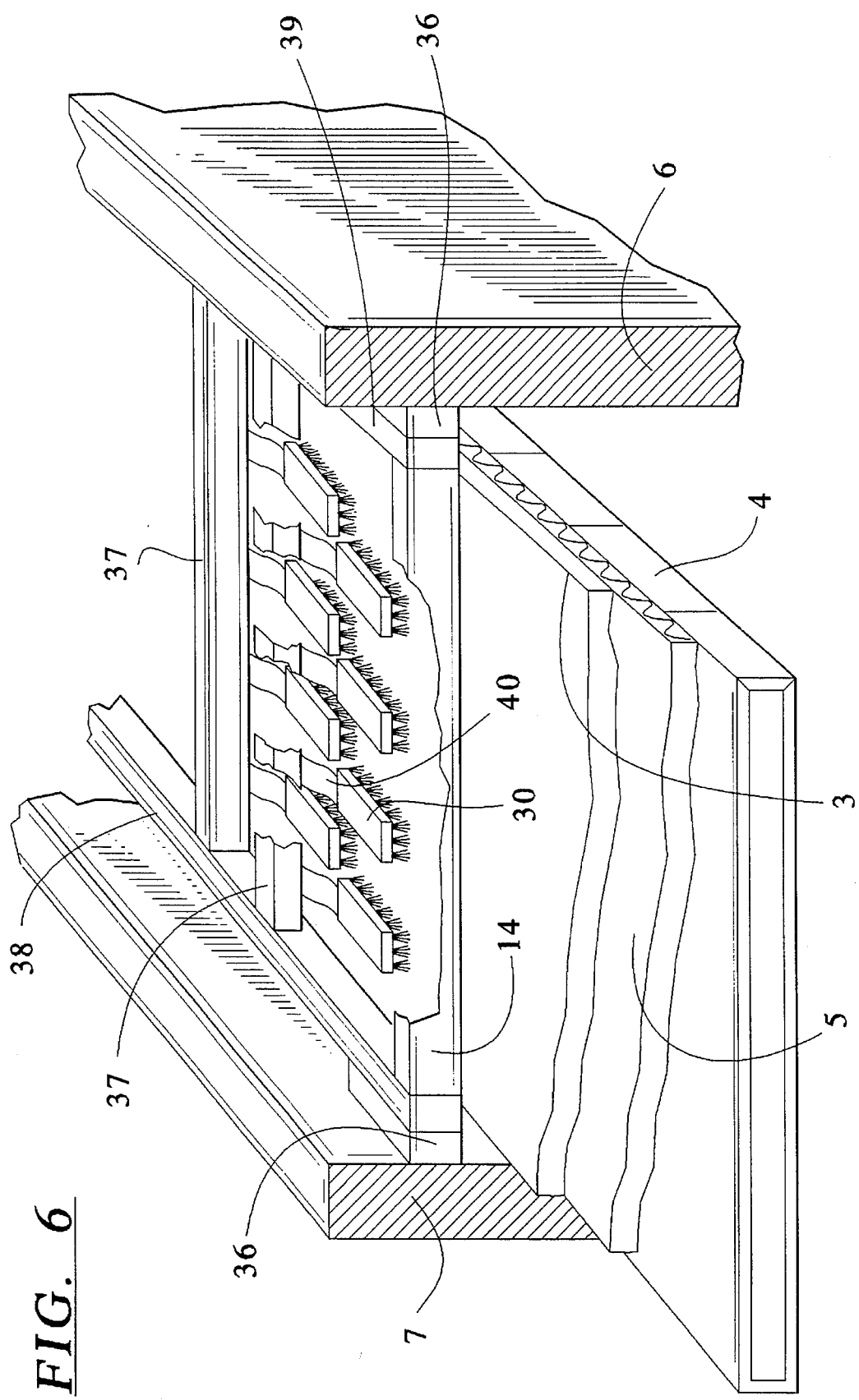
FIG. 6 is a perspective view with portions broken away for purposes of illustration showing a way of arranging the brushes for applying pressure on the belt.

In the arrangement of FIG. 6, the fastening of the brushes 30 in the frame 14 is accomplished in a different manner. The frame 14 is composed of lengthwise members, such as 38 and 39, and crossbars 37 which extend therebetween. The frame 14 is fixedly mounted to the lateral frame members 6 and 7 by screws and cross pieces 36. The brushes 30 are mounted to the crossbars 37 by means of elastic blades or spring blades 40 and will be able to apply a predetermined pressure onto the pressure belt 3. In order to simplify the drawing, only two rows of brushes 30 have been represented, but it is obvious that the device has a plurality of rows of brushes, as has been represented in FIG. 4 with the brushes of one row offset from the brushes of the adjacent row.

In FIG. 7, the locations of the various pressure elements 1 in the heating section of the machine are illustrated. This Figure shows the possible location of the brushes above the pressure belt 3. The brushes 26, which are carried by the crossbar 23, extend over the whole width of the pressure belt 3. The brushes 28, 28a and 28b have different sizes, such as widths, so as to be able to exert a differential pressure onto the pressure belt 3 by modifying the characteristics of the elastic spring blades 8 used in the device of FIG. 2. Finally, it might happen that for a particular job only brushes such as 41 of the crossbar 42 are used.

It should be noted that the use of brushes with different hardnesses also allows adjusting the pressure on the pressure belt 3. On the one hand, the use of brushes with the exclusion of each other as pressure means ensures a perfect removal of humidity resulting from the drying of the corrugated board web 5, since this humidity can spread through the bristles of the brush, which option is not possible when using compact pressure means.

Although various minor modifications may be suggested by those versed in the art, it should be understood that I wish to embody within the scope of the patent granted hereon all such modifications as reasonably and properly come within the scope of my contribution to the art.

I claim:

1. In a device for processing corrugated board having a core web of preglued corrugations with upper and lower cover webs secured to the corrugations of the core web, said device having at least one lower heating plate and a lower run of a continuous pressure belt disposed thereabove to form a path for receiving the corrugated board web moving in a first direction at a linear speed, said lower run of the belt travelling at the same linear speed as the corrugated board and pressing the upper paper web against the core web, and means for acting on the pressure belt to load the belt, the improvements comprising the means for loading the pressure belt comprising a crossbar being mounted between two lateral frames for pivotable movement around a pivot point, a plurality of brushes to permit the removal of humidity residing in the corrugated board web and means for mounting the brushes on the crossbar so that pivoting of the bar changes the pressure of the load on the belt.

2. In a device according to claim 1, wherein the means for mounting includes elastic blades.

3. In a device according to claim 2, wherein the brushes have different sizes.

4. In a device according to claim 1, which includes more than one crossbar with brushes being mounted for pivotable movement between the two lateral frames, each crossbar being pivotable to a position to render the brushes mounted thereon inoperative.

5. In a device according to claim 1, wherein the brushes are linked to the crossbar by means of elastic blades, said brushes having different sizes and the crossbar being equipped with a stopping and locking device in order to limit rotation in one direction.

6. In a device for processing corrugated board having a core web of preglued corrugations with upper and lower cover webs secured to the corrugations of the core web, said device having at least one lower heating plate and a lower run of a continuous pressure belt disposed thereabove to form a path for receiving the corrugated board web moving in a first direction at a linear speed, said lower run of the belt travelling at the same linear speed as the corrugated board and pressing the upper paper web against the core web, and means for acting on the pressure belt to load the belt, the improvements comprising the means for loading the pressure belt comprising a plurality of brushes to permit the removal of humidity residing in the corrugated board web, said plurality of brushes being mounted in a frame, said frame being movable vertically in a cradle which is rigidly fitted on lateral frame members by means of fastening clips, said cradle being equipped with an expandable chamber which acts on an upper surface of the frame under the action of fluid to urge the brushes against the lower run.

7. In a device according to claim 6, wherein the brushes are arranged in a checkerboard pattern onto crossbars of the frame and they are linked to the crossbars by means of elastic blades.

8. In a device for processing corrugated board having a core web of preglued corrugations with upper and lower cover webs secured to the corrugations of the core web, said device having at least one lower heating plate and a lower run of a continuous pressure belt disposed thereabove to form a path for receiving the corrugated board web moving in a first direction at a linear speed, said lower run of the belt travelling at the same linear speed as the corrugated board and pressing the upper paper web against the core web, and means for acting on the pressure belt to load the belt, the improvements comprising the means for loading the pressure belt comprising a plurality of brushes to permit the removal of humidity residing in the corrugated board web, a channel-shaped beam containing an expandable chamber, and means mounting the beam between two lateral frame members, said brushes being fitted to slide vertically within said channel-shaped beam so that the expandable chamber acts on the upper surface of the brush under the action of a fluid being introduced therein to urge the brushes against the lower run.

9. In a device according to claim 8, wherein the means for mounting the beam includes a crossbar mounted for pivotable movement between the two lateral frame members with the beam attached thereto.

* * * * *